(12) United States Patent
Wu et al.

(10) Patent No.: US 12,454,327 B2
(45) Date of Patent: Oct. 28, 2025

(54) WIRELESS APPARATUS OF ELECTRIC MOTORCYCLE

(71) Applicant: Kwang Yang Motor Co., Ltd., Kaohsiung (TW)

(72) Inventors: Hao-Yu Wu, Kaohsiung (TW); Feng-Chih Tsai, Kaohsiung (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 562 days.

(21) Appl. No.: 17/954,751

(22) Filed: Sep. 28, 2022

(65) Prior Publication Data

US 2023/0135878 A1   May 4, 2023

(30) Foreign Application Priority Data

Oct. 29, 2021 (TW) ................................ 110140302

(51) Int. Cl.
| | | |
|---|---|---|
| *B62J 45/41* | (2020.01) | |
| *B62J 43/16* | (2020.01) | |
| *B62J 45/423* | (2020.01) | |
| *B62K 11/02* | (2006.01) | |

(52) U.S. Cl.
CPC .............. *B62J 45/41* (2020.02); *B62J 43/16* (2020.02); *B62J 45/423* (2020.02); *B62K 11/02* (2013.01); *B62K 2204/00* (2013.01)

(58) Field of Classification Search
CPC . B62J 45/41; B62J 43/16; B62J 45/423; B62J 45/00; B62J 50/22; B62K 11/02; B62K 2204/00; B62K 11/04; B60C 23/0408; B60C 23/0418; H04W 4/44; H04W 4/48
See application file for complete search history.

(56) References Cited

U.S. PATENT DOCUMENTS

| | | | |
|---|---|---|---|
| 2002/0101342 A1 | 8/2002 | Yamagiwa et al. | |
| 2010/0134270 A1* | 6/2010 | Ando | B60C 23/006 340/447 |
| 2022/0138807 A1* | 5/2022 | Penaflor | B62J 3/10 705/14.73 |

(Continued)

FOREIGN PATENT DOCUMENTS

| | | | | |
|---|---|---|---|---|
| CN | 104050794 B | 8/2017 | | |
| CN | 108284912 A * | 7/2018 | .............. | B62J 45/00 |

(Continued)

*Primary Examiner* — Drew J Brown
(74) *Attorney, Agent, or Firm* — Bradley J. Thorson; DeWitt LLP

(57) ABSTRACT

A wireless apparatus of an electric motorcycle is assembled to a body of the electric motorcycle and has a receiver, a front wheel tire pressure sensor, and a rear tire pressure detector. The receiver is disposed at and extends out from one of a left side and a right side of a frame of the body. The front wheel tire pressure sensor and the rear wheel tire pressure sensor are disposed at a front wheel and a rear wheel of the body, respectively, and communicate with the receiver via wireless communications. Wherein, the receiver is located aside to prevent shielding effect caused by a battery of the body, thereby enhancing signal quality to allow the receiver to stably receive signals from the front wheel tire pressure sensor and the rear wheel tire pressure sensor.

6 Claims, 5 Drawing Sheets

(56) References Cited

U.S. PATENT DOCUMENTS

2022/0314818 A1* 10/2022 Bernatchez ............. B60L 15/20

FOREIGN PATENT DOCUMENTS

| CN | 110248864 | A | | 9/2019 | | |
|----|-----------|---|---|--------|---|---|
| CN | 111661229 | A | * | 9/2020 | ............. | B62J 43/16 |
| CN | 113734331 | A | * | 12/2021 | | |
| CN | 118270164 | A | * | 7/2024 | | |
| CN | 118323308 | A | * | 7/2024 | | |
| EP | 3421270 | B1 | | 7/2021 | | |
| JP | 2019131146 | A | * | 8/2019 | | |
| TW | 201226229 | A | | 7/2012 | | |
| WO | WO-2012090241 | A1 | * | 7/2012 | ............. | B60L 50/51 |
| WO | WO-2013061385 | A1 | * | 5/2013 | ............... | B60K 1/04 |
| WO | WO-2020223014 | A1 | * | 11/2020 | ........... | A42B 3/0453 |

* cited by examiner

WIRELESS APPARATUS OF ELECTRIC MOTORCYCLE

BACKGROUND OF THE INVENTION

1. Field of the Invention

The present invention relates to a wireless apparatus, especially to a wireless apparatus mounted on an electric motorcycle.

2. Description of Related Art

To enhance functions of an electric vehicle, a smart instrument, a wireless communication module, and a wireless tire pressure module may be selected to be mounted on the electric vehicle. The smart instrument may connect to a mobile phone via wireless connection in 2.4 GHz frequency band for data exchange. The wireless communication module may connect to telecommunication base station via mobile communication network for recording real time data and monitoring vehicle conditions. The wireless tire pressure module may connect to tire pressure detectors mounted to a front wheel and a rear wheel in 2.4 GHz frequency band for monitoring tire pressures of the front wheel and the rear wheel, and transmitting the tire pressures to the instrument to display. Usage safety is enhanced.

However, a conventional electric motorcycle has a battery disposed inside the frame and located between the front wheel and the rear wheel of the conventional electric motorcycle. Wireless signals traveling in a longitudinal direction is easily shielded by a structure of the battery, thereby causing poor signal connection and hindering the wireless signals from normal function.

SUMMARY OF THE INVENTION

Problem to Be Solved

The main objective of the present invention is to provide a wireless apparatus of an electric motorcycle to improve on the shortcomings that the wireless signals traveling in a longitudinal direction are easily shielded by the battery of the conventional electric motorcycle and the function of the wireless signals is affected adversely.

Technical Solution Solving the Problem

In order to achieve the above objective, the wireless apparatus of the electric motorcycle in accordance with the present invention is assembled to a body of the electric motorcycle. The body comprises a frame, a battery, a motor, a motor controller, a front wheel, and a rear wheel. The battery is connected with the frame. The motor and the motor controller are disposed at a bottom of the frame. The front wheel is disposed below a front side of the frame. The rear wheel is disposed below a rear side of the frame. The wireless apparatus comprises:

- a receiver disposed at and extending out from one of a left side and a right side of the frame;
- a front wheel tire pressure sensor disposed at the front wheel and communicating with the receiver via a wireless communication; and
- a rear wheel tire pressure sensor disposed at the rear wheel and communicating with the receiver via a wireless communication.

Furthermore, the motor and the motor controller are located below or behind the battery; and the receiver is located behind the motor.

Further, the wireless apparatus comprises an instrument. The instrument is disposed above the front side of the frame and is located in front of the battery. A vertical datum plane and a horizontal datum plane being perpendicular to each other are defined to pass through a center of mass of the battery. The instrument is located above the horizontal datum plane and in front of the vertical datum plane. The front wheel is located below the horizontal datum plane and in front of the vertical datum plane. The receiver is located below the horizontal datum plane and behind the vertical datum plane.

Further, signals in a same frequency band are used by the instrument and the receiver.

Further, the signals used by the instrument and the receiver are in 2.4 GHz frequency band.

Further, the frame includes a main-frame and a sub-frame located behind the main-frame. The battery is mounted in the main-frame. The receiver is disposed at one of a left side and a right side of the sub-frame.

Further, the sub-frame includes a left pipe and a right pipe. When viewed from a top of the electric motorcycle, the receiver partially overlaps one of the left pipe and the right pipe.

Further, the wireless apparatus comprises a wireless communication module. The wireless communication module is disposed in the sub-frame and operates in accordance with a long term evolution communication protocol.

Efficacy of the Invention

1. The receiver is disposed at and extends out from the left side or the right side of the frame, and the receiver is placed aside to avoid shielding effect caused by the battery. Therefore, signal quality is improved, and the receiver can stably receive signals from the front wheel tire pressure sensor and the rear wheel tire pressure sensor.
2. The instrument and the receiver are located at a front side and a rear side with respect to the battery, respectively. So communications between the receiver and the front wheel tire pressure sensor and the rear wheel tire pressure sensor are free from being interfered by signals from the instrument.
3. Functions and applications of Internet of things can be added because of the wireless communication module. The wireless communication module uses signals in accordance with long term evolution (LTE) communication protocol, which do not interfere with the signals in 2.4 GHz used by the instrument and the receiver.

DETAILED DESCRIPTION OF THE PREFERRED EMBODIMENTS

Figure 1:
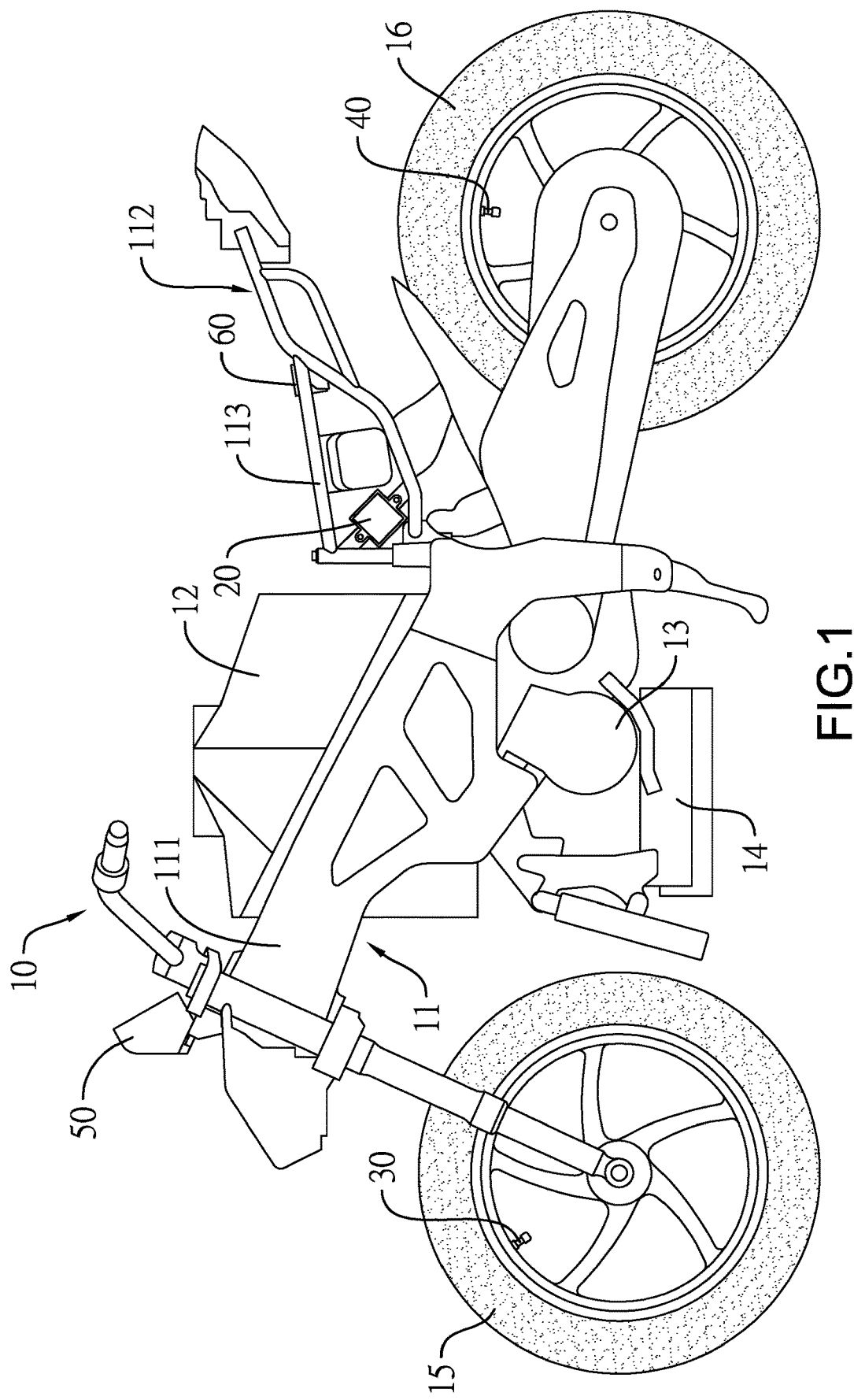
FIG. 1 is a side schematic view of a preferred embodiment of a wireless apparatus of an electric motorcycle in accordance with the present invention disposed on a frame.

With reference to FIGS. 1 to 4, a wireless apparatus of an electric motorcycle in accordance with the present invention is assembled to a body 10 of the electric motorcycle. The body 10 comprises a frame 11, a battery 12, a motor 13, a motor controller 14, a front wheel 15, and a rear wheel 16. The battery 12 is connected with the frame 11. The motor 13 and the motor controller 14 are disposed at a bottom of the frame 11. The front wheel 15 is disposed below a front side of the frame 11. The rear wheel 16 is disposed below a rear side of the frame 11. The battery 12 may be mounted inside the frame 11 or a housing of the battery 12 may be integrally formed with the frame 11 as a whole piece.

The wireless apparatus comprises a receiver 20, a front wheel tire pressure sensor 30, and a rear wheel tire pressure sensor 40. The receiver 20 is disposed at and extends out from one of a left side and a right side of the frame 11. The front wheel tire pressure sensor 30 is disposed at the front wheel 15 and communicates with the receiver 20 via a wireless communication. The rear wheel tire pressure sensor 40 is disposed at the rear wheel 16 and communicates with the receiver 20 via a wireless communication.

The motor 13 and the motor controller 14 are located below or behind the battery 12. The receiver 20 is located behind the motor 13.

Figure 2:
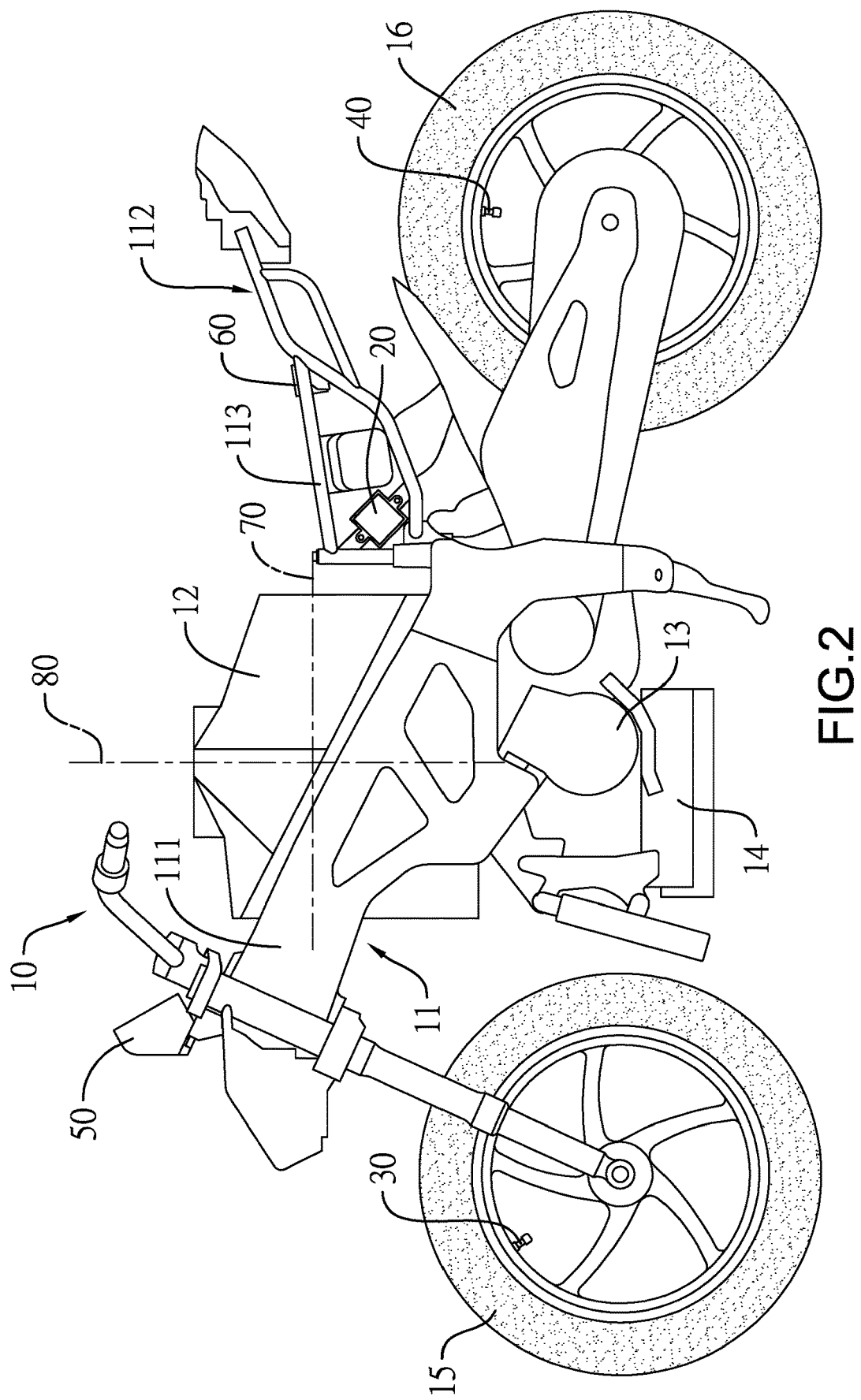
FIG. 2 is another side schematic view of the preferred embodiment of the wireless apparatus of the electric motorcycle disposed on the frame.

In addition, the wireless apparatus comprises an instrument 50. The instrument 50 is disposed above the front side of the frame 11 and in front of the battery 12. As shown in FIG. 2, a horizontal datum plane 70 and a vertical datum plane 80 being perpendicular to each other are defined to pass through a center of mass of the battery 12. The instrument 50 is located above the horizontal datum plane 70 and in front of the vertical datum plane 80. The front wheel 15 is located below the horizontal datum plane 70 and in front of the vertical datum plane 80. The receiver 20 is located below the horizontal datum plane 70 and behind the vertical datum plane 80. Wherein, the instrument 50 and the receiver 20 both use signals in 2.4 GHz frequency band. A user can use a mobile phone to connect with the instrument 50 for functions of navigation information transmission, music control, and notification display.

Figure 3:
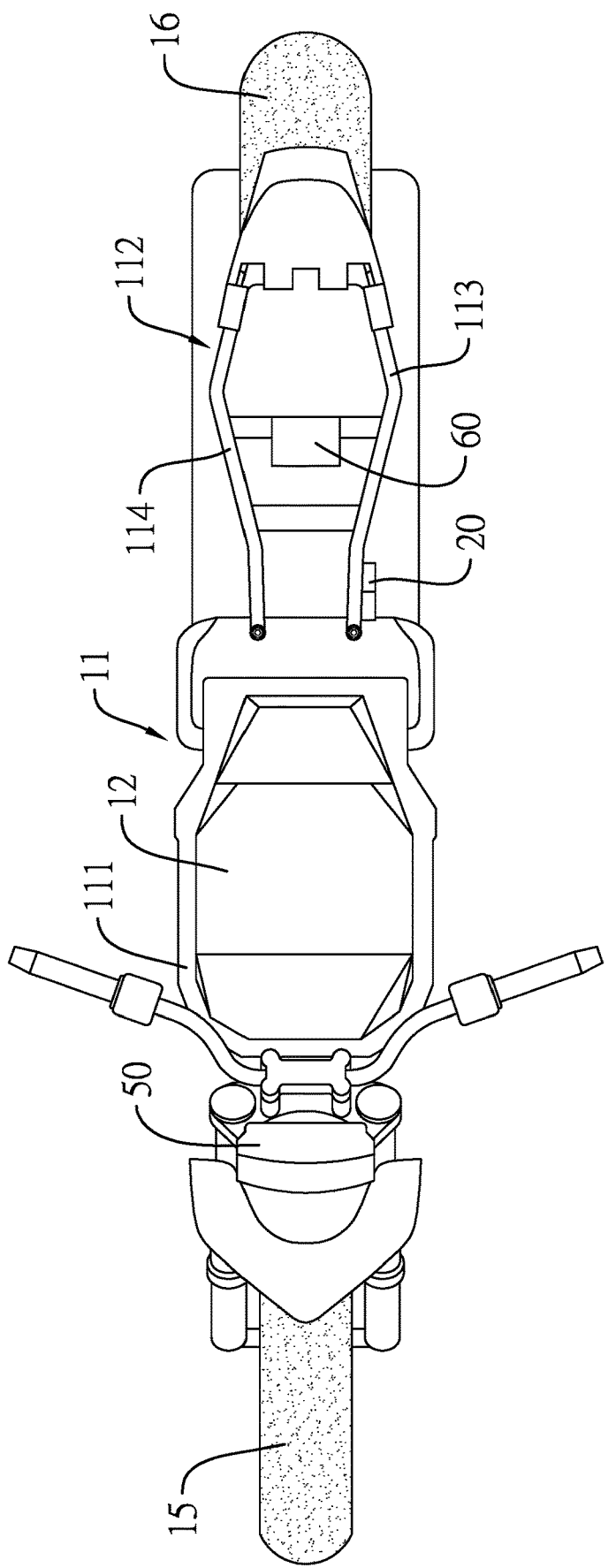
FIG. 3 is a top schematic view of the preferred embodiment of the wireless apparatus of the electric motorcycle disposed on the frame in FIG. 1.
Figure 4:
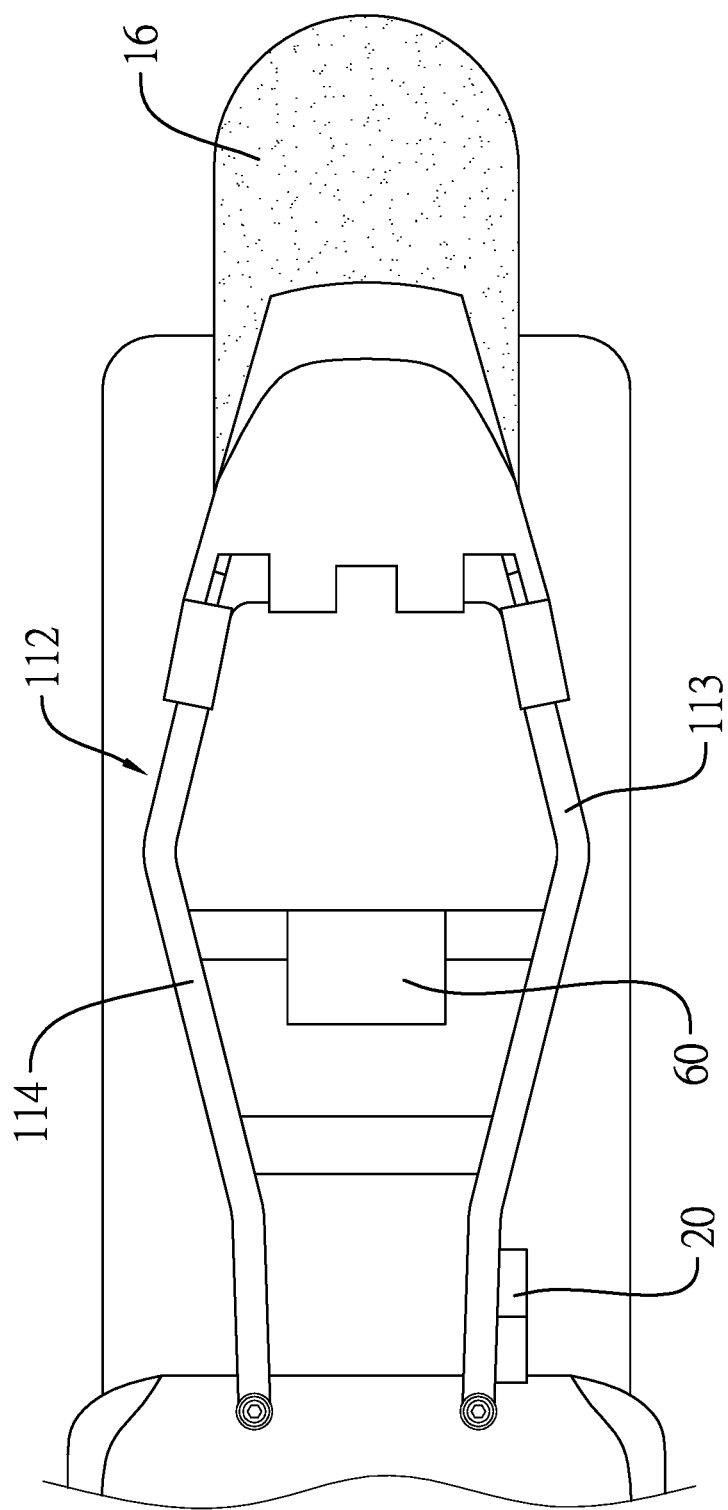
FIG. 4 is an enlarged top schematic view of FIG. 3.
Figure 5:
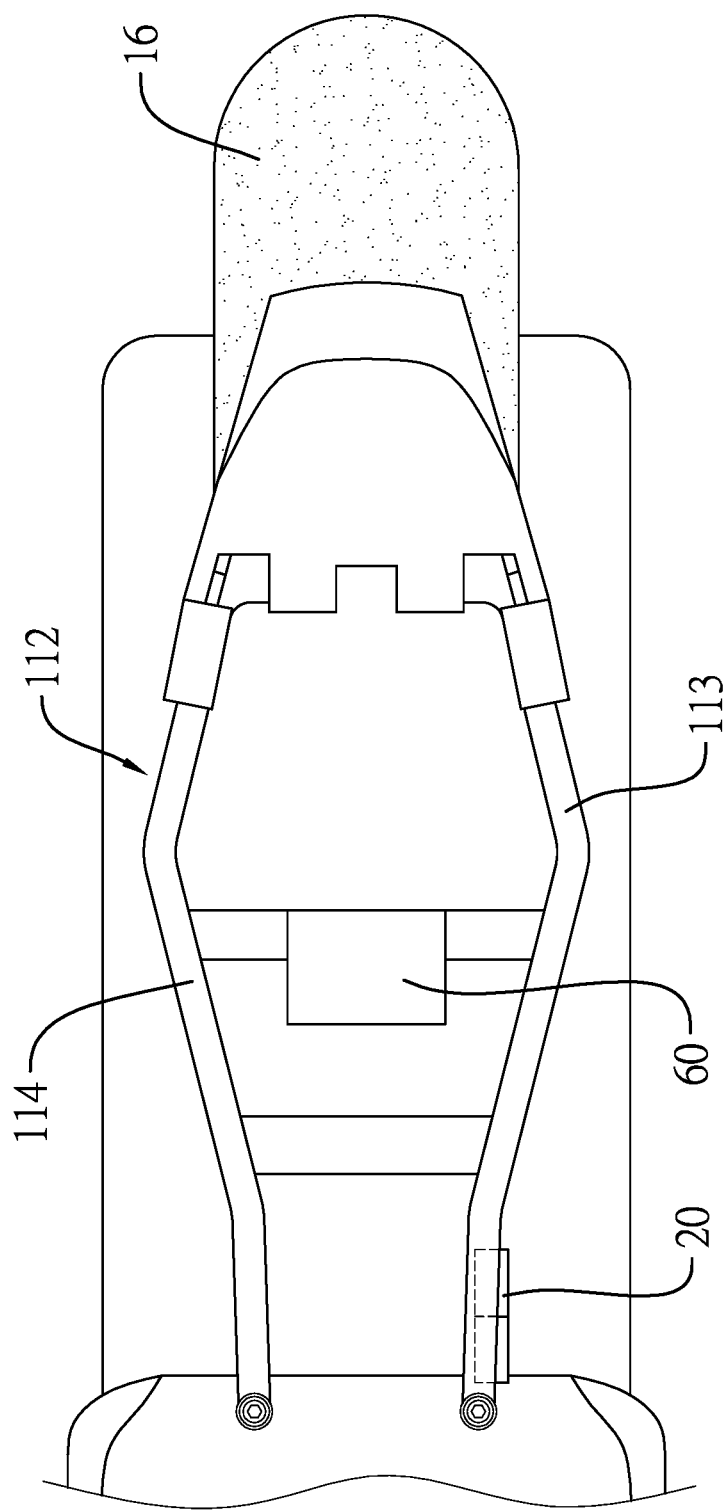
FIG. 5 is an enlarged top schematic view of another preferred embodiment of a wireless apparatus of an electric motorcycle in accordance with the present invention disposed on a frame.

As shown in FIGS. 3 and 4, the frame 11 includes a main-frame 111 and a sub-frame 112 located behind the main-frame 111. The battery 12 is mounted in the main-frame 111. The receiver 20 is disposed at one of a left side and a right side of the sub-frame 112. As shown in FIG. 5, the sub-frame 112 includes a left pipe 113 and a right pipe 114. The left pipe 113 and the right pipe 114 each have respective bracing segments. The receiver 20 may be disposed on an external surface of the bracing segment of the left pipe 113 or the right pipe 114. When viewed from the top, the receiver 20 partially overlaps the left pipe 113 or the right pipe 114. As shown in FIG. 4, the receiver 20 does not overlap the left pipe 113 or the right pipe 114 alternatively.

The wireless apparatus comprises a wireless communication module 60. The wireless communication module 60 is disposed in the sub-frame 112 and operates in accordance with a long term evolution communication protocol (LTE communication protocol) to communicate with an external device with respect to the body 10. Information of vehicle condition, vehicle position, etc., can be uploaded to a cloud system, so the user can remotely confirm said vehicle information. Functions and applications of Internet of things can be added to the electric motorcycle via the wireless communication module 60.

The receiver 20 deviated from the frame 11 and extends out from the left side or the right side of the frame 11 to prevent shielding effect caused by the battery 12. The receiver 20 can stably receive signals from the front wheel tire pressure sensor 30 and the rear wheel tire pressure sensor 40. So the user can confirm conditions of the wheels of the electric motorcycle to avoid accidents caused by insufficient tire inflation pressure or flat tire. The wireless signals from the receiver 20, the front wheel tire pressure sensor 30, and the rear wheel tire pressure sensor 40 traveling in a longitudinal direction pass the receiver 20 placed aside, thereby effectively improving the shielding caused by the battery 12 and enhancing signal quality.

In addition, the instrument 50 is located in front of the battery 12. The receiver 20 is located aside and behind the battery 12. Communications between the receiver 20, the front wheel tire pressure sensor 30 and the rear wheel tire pressure sensor 40 are prevented from being interfered by signals from the instrument 50 because of the battery 12. The instrument 50 is disposed at a head of the body 10 and above the battery 12. When the instrument 50 is integrated with the wireless communication module 60, a wireless communicating path therebetween is higher than the position of the battery 12. So wireless shielding to the communications of the mobile phone of the user and the instrument 50 is reduced.

Furthermore, functions and applications of Internet of things can be added because of the wireless communication module 60. The wireless communication module 60 uses signals in accordance with long term evolution (LTE) communication protocol, which does not interfere with the signals in 2.4 GHz used by the receiver 20. The wireless communication module 60 is disposed in the sub-frame 112 and is located at a position uncovered by metal shielding, thereby reducing shielding of signals traveling in a vertical direction and a horizontal direction. Shortcomings because of poor signals can be reduced. The wireless communication module 60 can smoothly communicate with base stations nearby.

Through the foregoing paragraphs, the preferred embodiment and detailed descriptions thereof are described for presenting the technical means adopted by the present invention to solve the problem, not to constrain the scope of the claimed invention. Anything that is literally consistent with the claims of the present invention and variations and modifications that are equivalent to the claims are encompassed by the scope of the claims of the present invention.

What is claimed is:

1. A wireless apparatus of an electric motorcycle, the wireless apparatus assembled to a body of the electric motorcycle; the body comprising a frame, a battery, a motor, a motor controller, a front wheel, and a rear wheel; the battery connected with the frame; the motor and the motor controller disposed at a bottom of the frame and located below or behind the battery; the front wheel disposed below a front side of the frame; and the rear wheel disposed below a rear side of the frame; wherein the wireless apparatus comprises:
   a receiver disposed at and extending out from one of a left side and a right side of the frame and located behind the motor;

a front wheel tire pressure sensor disposed on the front wheel and communicating with the receiver via a wireless connection;

a rear wheel tire pressure sensor disposed on the rear wheel and communicating with the receiver via a wireless connection; and an instrument disposed above the front side of the frame and in front of the battery;

wherein a horizontal datum plane and a vertical datum plane being perpendicular to each other are defined to pass through a center of mass of the battery;

the instrument is located above the horizontal datum plane and in front of the vertical datum plane;

the front wheel is located below the horizontal datum plane and in front of the vertical datum plane; and the receiver is located below the horizontal datum plane and behind the vertical datum plane.

2. The wireless apparatus of the electric motorcycle as claimed in claim 1, wherein signals in a same frequency band are used by the instrument and the receiver.

3. The wireless apparatus of the electric motorcycle as claimed in claim 2, wherein the signals used by the instrument and the receiver are in 2.4 GHz frequency band.

4. The wireless apparatus of the electric motorcycle as claimed in claim 1, wherein the frame includes a main-frame and a sub-frame located behind the main-frame; the battery is mounted in the main-frame; and the receiver is disposed at one of a left side and a right side of the sub-frame.

5. The wireless apparatus of the electric motorcycle as claimed in claim 4, wherein the sub-frame includes a left pipe and a right pipe; when viewed from a top of the electric motorcycle, the receiver partially overlaps one of the left pipe and the right pipe.

6. The wireless apparatus of the electric motorcycle as claimed in claim 4, wherein the wireless apparatus comprises a wireless communication module; the wireless communication module is disposed in the sub-frame and operates in accordance with a long term evolution communication protocol.

* * * * *